Figure 1:
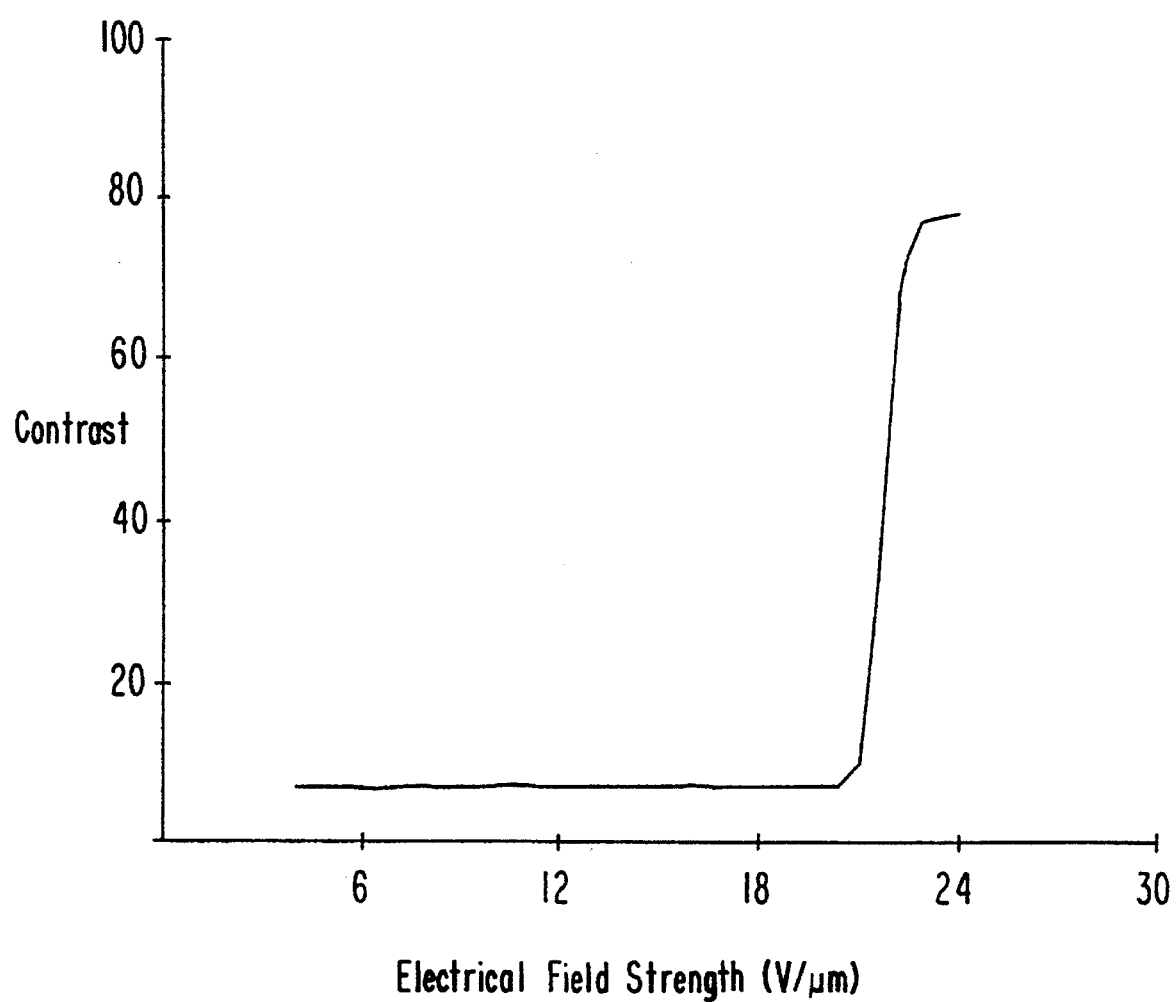

United States Patent [19]

Escher et al.

[11] Patent Number: 5,594,575
[45] Date of Patent: Jan. 14, 1997

[54] FERROELECTRIC LIQUID-CRYSTAL SYSTEMS HAVING THREE OR MORE CHIRAL ADDITIVES WITH DIFFERENT SIGNS OF THE HELICAL TWIST IN THE CHOLESTERIC PHASE

[75] Inventors: Claus Escher, Mühltal; Hans-Rolf Dübal, Königstein/Taunus, both of Germany; Takamasa Harada, Inzai-machi, Japan; Wolfgang Hemmerling, Sulzbach, Germany; Gerhard Illian, Frankfurt am Main, Germany; Ingrid Müller, Niedernhausen, Germany; Mikio Murakami, Kakegawa, Japan; Dieter Ohlendorf, Liederbach; Rainer Wingen, Hattersheim am Main, both of Germany

[73] Assignee: Hoechst Aktiengesellschaft, Frankfurt, Germany

[21] Appl. No.: 432,673

[22] Filed: May 2, 1995

Related U.S. Application Data

[63] Continuation of Ser. No. 272,854, Jul. 8, 1994, abandoned, which is a continuation of Ser. No. 761,812, filed as PCT/EP90/00459, Mar. 21, 1990, abandoned.

[30] Foreign Application Priority Data

Mar. 22, 1989 [DE] Germany .......................... 39 09 354.9

[51] Int. Cl.$^6$ ...................................................... G02F 1/13
[52] U.S. Cl. .................................................................. 349/171
[58] Field of Search ................................... 359/90, 99, 103, 359/100, 101, 104

[56] References Cited

U.S. PATENT DOCUMENTS

| | | | |
|---|---|---|---|
| 4,824,217 | 4/1989 | Chan et al. ............................ | 359/100 |
| 4,852,978 | 8/1989 | Davey et al. .............................. | 359/75 |
| 4,913,838 | 4/1990 | Miyazawa et al. ..................... | 359/100 |
| 4,915,868 | 4/1990 | Günther et al. ............................ | 359/94 |
| 4,961,874 | 10/1990 | Takeuchi et al. ....................... | 359/106 |
| 4,961,875 | 10/1990 | Ohno et al. .............................. | 359/106 |
| 4,980,083 | 12/1990 | Shibata et al. .......................... | 359/103 |
| 5,013,479 | 5/1991 | Minai et al. ............................. | 359/103 |
| 5,046,830 | 9/1991 | Nakanowatari .......................... | 359/100 |
| 5,061,047 | 10/1991 | Bradshaw et al. ...................... | 359/100 |
| 5,071,589 | 12/1991 | Dübal et al. ............................. | 359/103 |
| 5,106,531 | 4/1992 | Murashiro et al. . | |
| 5,149,461 | 9/1992 | Terashima et al. ..................... | 359/104 |
| 5,190,691 | 3/1993 | Kikuchi et al. ......................... | 359/104 |

FOREIGN PATENT DOCUMENTS

| | | |
|---|---|---|
| 62-205190 | 9/1987 | Japan . |
| 62-205189 | 9/1987 | Japan . |
| 2163273 | 2/1986 | United Kingdom . |

*Primary Examiner*—William L. Sikes
*Assistant Examiner*—Kenneth Parker
*Attorney, Agent, or Firm*—Curtis, Morris & Safford, P.C.

[57] ABSTRACT

Ferroelectric liquid-crystal systems having high spontaneous polarization, in particular >35 nC cm$^{-2}$, and good orientation properties in the ferroelectric phase, in particular the $S_C^*$ phase, contain at least three different optically active compounds, preferably as dopes in a base mixture which is not itself optically active and has a nematic phase above the smectic phase. The optically active compounds are selected so that they do not all induce a helix of the same rotation sense in the nematic phase. Their relative concentrations are selected so that the total resultant pitch of the helix throughout the cholesteric phase is not less than 10 μm.

9 Claims, 2 Drawing Sheets

FERROELECTRIC LIQUID-CRYSTAL SYSTEMS HAVING THREE OR MORE CHIRAL ADDITIVES WITH DIFFERENT SIGNS OF THE HELICAL TWIST IN THE CHOLESTERIC PHASE

This application is a continuation of application Ser. No. 08/272,854, filed Jul. 8, 1994, abandoned, which is a continuation of Ser. No. 07/761,812, filed as PCT/EP90/00459, Mar. 21, 1990, now abandoned.

Ferroelectric liquid-crystal systems for use in electro-optical switching and display elements should have short switching times and, in order to achieve good contrast conditions, the most unitary planar orientation possible in the ferroelectric phase, in particular in the $S_C^*$ phase. Apart from exceptions, such systems comprise a base mixture of substances which form at least one $S_C$ phase, but are not themselves optically active, and Optically active dopes, which induce spontaneous polarization in the $S_C$ phase of the base mixture, forming the $S_C^*$ phase, which is generally used for operating ferroelectric displays. Here, the shorter the switching times, the higher the spontaneous polarization of the ferroelectric mixture used.

It is known that a unitary planar orientation in the $S_C$ phase in the display by cooling from the isotropic phase can be achieved particularly well if the phase sequence of the base mixture is isotropic→nematic→smectic A→smectic C with decreasing temperature. This also applies in principle to optically active doped mixtures (isotropic→$N^*$→$S_A^*$→$S_C^*$).

Besides the desired spontaneous polarization, optically active dopes induce in the $N^*$ phase a helical twisting (helix) whose pitch is smaller the higher the concentration of the dope. In addition, the pitch of the helix is temperature dependent.

However, a unitary planar orientation can only be achieved if the pitch of the helix is significantly larger and at least about five times as large as the thickness of the liquid-crystal layer used in a display.

It is known from the art of conventional nematic displays that the pitch of the helix induced in the $N^*$ phase by an optically active dope can be compensated for a certain temperature by addition of a second dope which induces a helix with the opposed rotation sense (DE-A-2,827,471). Due to the temperature dependency of the helix pitch in individual dopes, which generally varies considerably, compensation over a relatively large temperature range is normally not possible in this way. In the case of liquid-crystal systems having high spontaneous polarization with an absolute value of from about 35 nC cm$^{-2}$ which contain optically active dopes in relatively high concentration, the difficulty of helix compensation over relatively large temperature ranges becomes particularly noticeable. Even in the case of compensation carried out as well as possible, the above-described two-dope systems must be cooled very slowly through the cholesteric ($N^*$) phase to produce a good planar orientation in the $S_C^*$ phase. This requires plenty of time and high equipment complexity and is accordingly expensive.

The disadvantages indicated, in particular the necessity for slow cooling through the cholesteric phase, are avoided by the liquid-crystal mixture according to the invention. The invention therefore relates to a liquid-crystal mixture which has a ferroelectric phase, in particular an $S_C^*$ phase, in a temperature range which includes room temperature (25° C.) and preferably covers at least a range of from +10° to +50° C., and as a cholesteric phase is preferably at least 4° C. wide in a temperature range above the ferroelectric phase; which has a spontaneous polarization of at least 35 nC cm$^{-2}$ in the ferroelectric phase at room temperature (25° C.); and which contains several optically active compounds. This liquid-crystal mixture contains at least three optically active compounds, which do not all induce twist (helix) of the same sign in the cholesteric phase, and its relative concentrations are selected in a manner such that the total resulting helix pitch throughout the cholesteric phase is not less than 10 μm in absolute terms.

The rotation sense, i.e. the sign of the resultant helix, may be right-handed (+) or left-handed (−) here, and the sign may change in the cholesteric phase, but the absolute value of the pitch must not be less than 10 μm. This applies to displays in which the thickness of the liquid-crystal layer, as is usually customary, is about 2 μm. In the case of thicker layers, as are customary, for example, in displays operated in guest-host mode, the pitch must be correspondingly larger. Increased requirements of this type also apply to the case where the liquid-crystal orienting layer is not an organic polymer material, but instead SiO or SiO$_2$ (or a mixture of SiO and SiO$_2$) vapor-deposited at an angle.

In these cells with a relatively thick liquid-crystal layer or with SiO/SiO$_2$ orientation layers, the mixtures according to the invention can be employed with particular advantage, since the minimum helix pitch necessary here in the cholesteric phase in mixtures with high spontaneous polarization cannot be achieved in accordance with the prior art through mutual helix compensation by means of two optically active compounds.

In order to obtain high spontaneous polarization with the lowest possible content of optically active components in the mixture, all optically active components which contribute more than 10% of the spontaneous polarization should each induce a spontaneous polarization of the same sign.

The smallest possible amounts of dopes which induce a high spontaneous polarization of the same sign are expediently added.

Since optically active compounds frequently adversely affect other properties, for example the viscosity in the ferroelectric phase, in mixtures of the type according to the invention, such mixtures preferably comprise to at least 50 mol-%, relative to the overall mixture, of liquid-crystalline compounds which are not optically active.

It is particularly favorable for the mixtures to have an orthogonal smectic phase between the cholesteric ($N^*$) phase and the ferroelectric $S_C^*$ phase. The phase sequence is preferably I→$N^*$→$S_A^*$→$S_C^*$.

To prepare the mixtures according to the invention, optically active compounds are used whose spontaneous polarization at a certain temperature, in particular at room temperature (25° C.), in the ferroelectric phase and whose twist throughout the cholesteric phase have been determined. Since mixtures which comprise predominantly mixtures of non-optically active compounds are normally used in practice, the magnitude and sign of the polarization and the twist of the suitable optically active dopes are determined in test mixtures or directly in mixtures intended for use. If the concentrations of dopes are not excessive, P=P°.c and $Z^{-1}$=HTP.c to a very good approximation, where the symbols have the following meaning: P=spontaneous polarization, P°=polarizing power, Z=pitch of the helix, HTP= helical twisting power and c=concentration as a mole fraction of the optically active compound investigated.

Since the abovementioned equations also apply, to a good approximation, if several optically active compounds are added according to the invention to a base mixture, these equations can be generalized as P=$\Sigma_i P_i°.c$ and $Z^{-1}=\Sigma_i HTP_i.c_i$, where the index i denotes the various optically active compounds.

For mixtures according to the invention, the requirement $$|P(25° \text{ C.})|=|\Sigma_i P_i°(25° \text{ C.})c_i| \geq 35 \text{ nCcm}^{-2} \quad (1)$$

applies and $|Z^{-1}(T)|=|\Sigma_i HTP_i(T)c_i| \leq 1/10 \text{ μm}^{-1}$ applies for all temperatures in the cholesteric phase.

The second condition requires pitch compensation in the cholesteric phase and can generally be divided into the individual requirements $$|Z^{-1}(t_{SN})| \leq 1/10 \text{ μm}^{-1} \quad (2)$$

$$|Z^{-1}(T_{NI})| \leq 1/10 \text{ μm}^{-1} \quad (3)$$

where $T_{SN}$ and $T_{NI}$ denote the temperatures at the limits to the smectic and isotropic phases respectively.

The requirements (1), (2) and (3) are satisfied by using at least three optically active compounds which do not all induce a helix of the same rotation sense, i.e. do not all have the same sign of HTP. The P° values of the individual compounds should preferably all have the same sign and be of the same magnitude, so that high P values are achieved at low concentrations.

This allows dopes which are suitable for the mixtures according to the invention to be selected from a large number of dopes with known parameters. If, in the preliminary selection, the equations (1), (2) and (3) result in unphysical or unsuitably high values for $c_i$, further components must be added, or another combination of dopes must be selected.

The Examples below are intended to illustrate the invention, without representing a limitation. All percentages are mole per cent.

EXAMPLE 1

In a liquid-crystalline base mixture A, comprising

| | |
|---|---|
| 5-octoxy-2-[4-hexoxyphenyl]pyrimidine | 15.1% |
| 5-octoxy-2-[4-octoxyphenyl]pyrimidine | 5.0% |
| 5-octoxy-2-[4-butoxyphenyl]pyrimidine | 16.6% |
| 5-octoxy-2-[4-decoxyphenyl]pyrimidine | 9.2% |
| 5-octoxy-2-[4-dodecoxyphenyl]pyrimidine | 9.2% |
| 5-octoxy-2-[4-dodecoxyphenyl]pyrimidine | 13.5% |
| [4-(5-decylpyrimidin-2-yl)]phenyl trans-4-pentylcyclo-hexanecarboxylate | 21.4% |
| 4-[5-octylpyrimidin-2-yl]phenyl hexanecarboxylate | 5.0% |
| 4-(nonoxypyrimidin-5-yl)phenyl 2-chloro-4-methyl-pentanoate | 5.0% | the dopes

| | |
|---|---|
| (R)-4-(5-n-octoxypyrimidin-2-yl)phenyl (2,2pentamethylene-1,3-dioxolan-4-yl)methyl [sic] ether | I |
| 4-(2-octoxypyrimidin-5-yl)phenyl (2R,3R)-3-propyloxirane-2-carboxylate and | II |
| 4-(5-n-octylpyrimidin-2-yl)phenyl (R)-tetrahydrofuran-2-carboxylate | III | were investigated for polarizing and twisting power.
In this test, the following measured values were found:

Dope I
$HTP(T_{SN})=-7 \text{ μm}^{-1}$, $HTP(T_{NI})=-10 \text{ μm}^{-1}$,
$|P°(25° \text{ C.})|<20 \text{ nC/cm}^2$
Dope II
$HTP(T_{SN})=7.2 \text{ μm}^{-1}$, $HTP(T_{NI})=6.7 \text{ μm}^{-1}$,
$P°(25° \text{ C.})=600 \text{ nC/cm}^2$
Dope III
$HTP(T_{SN})=0.8 \text{ μm}^{-1}$, $HTP(T_{NI})=1.6 \text{ μm}^{-1}$,
$P°(25° \text{ C.})=120 \text{ nC/cm}^2$ The equations indicated above give the following theoretical values for a base mixture doped with 4.5% of (I), 4.35% of (II) and 8.3% of (III):

$$Z^{-1}(T_{SN})=0.0065 \text{ μm}^{-1}$$

$$Z^{-1}(T_{NI})=-0.026 \text{ μm}^{-1}$$

$$P(25° \text{ C.})=36 \text{ nC/cm}^2$$

The doping at the concentrations mentioned is carried out on the basis of these results. The actual measurements then gave

| T/°C. | 73 | 74 | 75 | 76 | 77 | 78 | 79 | 80 | 81 |
|---|---|---|---|---|---|---|---|---|---|
| Z/μm | +22 | +29 | +53 | >100 | ∞ | \|>100\| | −42 | −32 | −25 | and $P(25° \text{ C.})=38 \text{ nC/cm}^2$. The ferroelectric mixture has the phase sequence C-8 $S_C^*$ 66 $S_A^*$ 73 N* 81 I (transition temperatures in °C.).

EXAMPLES 2 AND 3

In a liquid-crystalline base mixture B, comprising

| | |
|---|---|
| 5-octyl-2-[4-hexoxyphenyl]pyrimidine | 17.7% |
| 5-octyl-2-[4-octoxyphenyl]pyrimidine | 15.6% |
| 5-octyl-2-[4-decoxyphenyl]pyrimidine | 11.8% |
| 5-octoxy-2-[4-butoxyphenyl]pyrimidine | 11.7% |
| 5-octoxy-2-[4-hexoxyphenyl]pyrimidine | 11.1% |
| 5-octoxy-2-[4-octoxyphenyl]pyrimidine | 5.1% |
| 5-octoxy-2-[4-decoxyphenyl]pyrimidine | 9.3% |
| [4-(5-dedocylpyrimidin-2-yl)]phenyl [sic] trans-4-pentyl-cyclohexanecarboxylate | 17.5% |
| the dopes I, II and (2S,3S)-2-[4-(5-octylpyrimidin-2-yl)-phenoxy]methyl-3-butyloxirane | IV |
| (4R,5R)-4-(5-n-octylpyrimidin-2-yl)phenyl 2,2-dimethyl-5-ethyl-1,3-dioxolane-4-carboxylate | V | were investigated for polarizing and twisting power. In this test, the following measured values were found:

| Dope | I | II | IV | V |
|---|---|---|---|---|
| $HTP(T_{SN})$/ μm$^{-1}$ | −7.0 | +5.5 | −1.9 | −1.1 |
| $HTP(T_{NI})$/ μm$^{-1}$ | −8.6 | +5.4 | −1.2 | −4.5 |
| $P°(25° \text{ C.})$/ nC/cm$^2$ | \|>15\| | +500 | +95 | +230 |

Two different dope combinations were selected on the basis of these measurement results:
Example 2: 5.4% of (II), 13.1% of (IV) and 1.5% of (V)
Example 3: 4.7% of (I), 9.0% of (II) and 8.0% of (IV)
Calculation of the resultant pitches and spontaneous polarizations by the abovementioned procedures gave the following theoretical values:

| Example | 2 | 3 |
|---|---|---|
| $Z^{-1}(T_{SN})/\mu m^{-1}$ | +0.032 | +0.014 |
| $Z^{-1}(T_{NI})/\mu m^{-1}$ | +0.067 | −0.014 |
| $P(25°\ C.)/nC/cm^2$ | +43.9 | +52.5 |

The base mixture B was doped with the concentrations mentioned on the basis of these results. The measurements then gave the following, in detail:

Example 2
Phase range: C-4 $S_C^*$ 64 $S_A^*$ 69 N, 80 I
Polarization: $P(25°\ C.)=+46.5\ nC/cm^2$

| T/°C. | 69 | 70 | 71 | 72 | 73 | 74 | 75 | 76 | 77 | 78 | 79 | 80 |
|---|---|---|---|---|---|---|---|---|---|---|---|---|
| Z/μm | +12 | +15 | +16 | +17 | +17 | +17 | +18 | +17 | +16 | +15 | +15 | +14 |

Example 3
Phase range: C-4 $S_C^*$ 60 $S_A^*$ 71 N* 77 I
Polarization: $P(25°\ C.)=+54\ nC/cm^2$ Pitch:

| T/°C. | 71 | 72 | 73 | 74 | 75 | 76 | 77 |
|---|---|---|---|---|---|---|---|
| Z/μm | +41 | +49 | +62 | >+100 | ∞ | >100 | >80 |

EXAMPLE 4

In the liquid-crystalline base mixture B, the dopes I, II and IV were dissolved in the respective mole percentages 3.43%, 6.56% and 5.83%.

The relative proportions were selected on the basis of the HTP values indicated in Examples 2 and 3 for the three individual dopes in the mixture B.

Calculation of the resultant pitches and spontaneous polarizations gave the following values:

$Z^{-1}(T_{SN})=+0.01\ lm^{-1}$ [sic]

$Z^{-1}(T_{NI})=-0.01\ \mu m^{-1}$ $P(25°\ C.)=38\ nC/cm^2$

The experimental findings gave the following:
Phase range: C-5 $S_C^*$ 65 $S_A^*$ 72 N* 85 I
Polarization: $P(25°\ C.)=+40\ nC/cn^2$ Pitch:

| T/°C. | 72 | 73 | 74 | 75 | 76 | 77 | ≧78 |
|---|---|---|---|---|---|---|---|
| Z/μm | +13 | +17.5 | +21 | +28 | +37 | +46 | >50 |

The mixture according to the invention was introduced into a test cell (cell thickness 2 μm) which had previously been vapor-deposited in an inclined manner on both sides with SiO at an angle of 83% [sic] in order to orient the liquid crystal. After cooling from the isotropic phase, an excellent, unitary orientation was produced, irrespective of the cooling rate. On switching using bipolar pulses, the electro-optical characteristic lines shown in FIGS. 1 and 2 were measured at temperatures of 25° C. and 45° C. The high contrast is based on the good and unitary orientation of the liquid-crystalline material.

FIG. 1 Electrooptical contrast curve on addressing with a bipolar pulse of pulse width 100 μm at a temperature of 25° C. (the contrast is plotted against the electric field strength).

Figure 2:
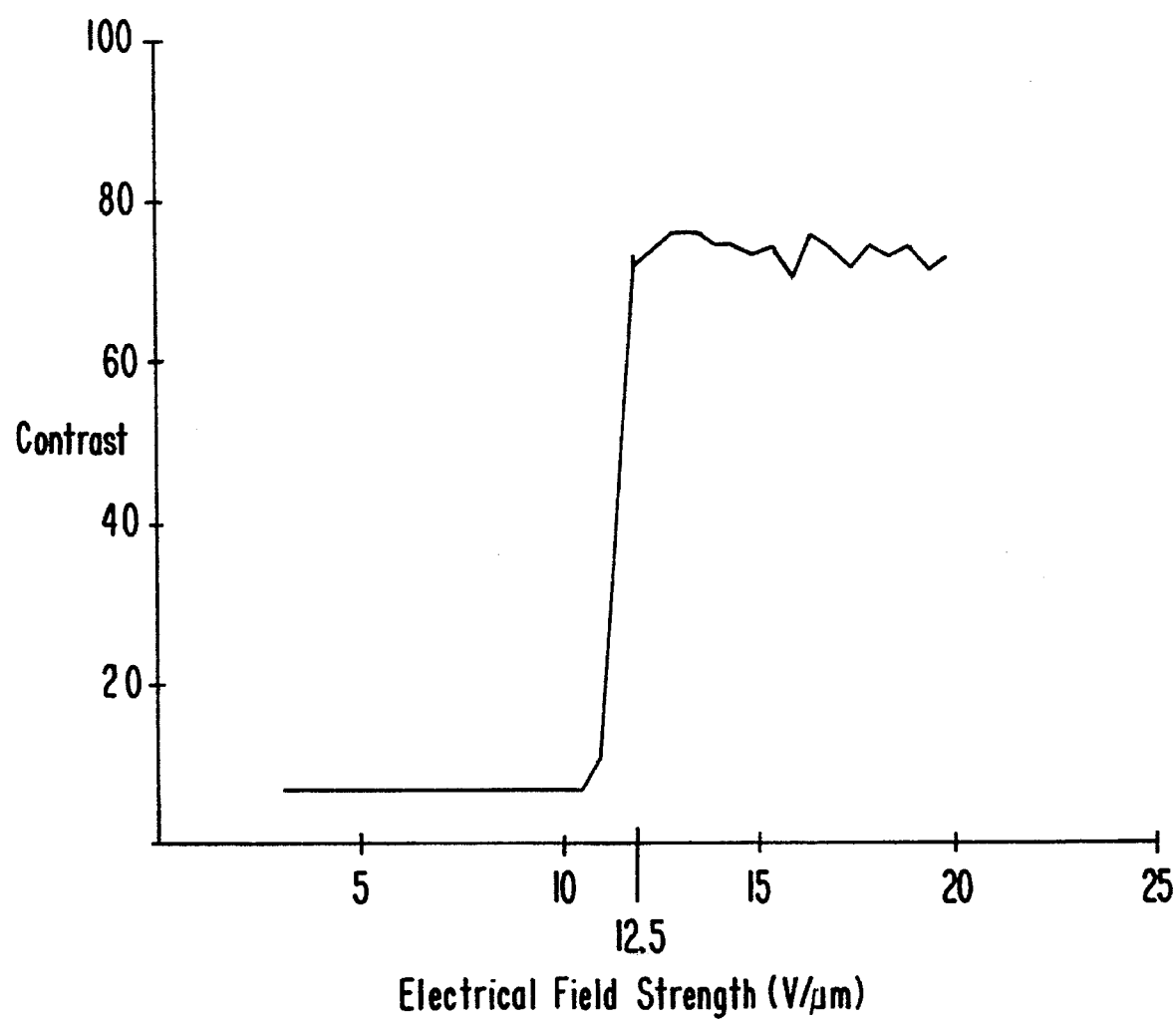

FIG. 2 As in FIG. 1, but at a temperature of 45° C.

We claim:

1. A method for producing a ferroelectric liquid crystal mixture having a smectic C* phase in a temperature range of from 10° C. to 50° C. and above the smectic phase a cholesteric phase having a width of 4° C. or more and having a spontaneous polarization with a value of 35 n $Cm^{-2}$ or more in the ferroelectric phase at room temperature (25° C.) comprising a) providing an optically non-active liquid crystalline base mixture, b) adding three or more optically active compounds, which do not all induce twist of the same sign in the cholesteric phase, in an amount that does not exceed 50% by weight of the weight of the total mixture; and c) adjusting relative concentrations of the optically active compounds so that the reciprocal value for the helical pitch ($Z^{-1}$) throughout the cholesteric phase is between 0 and 0.10 $\mu m^{-1}$.

2. A method as claimed in claim 1 wherein each of the optically active compounds present in the mixture induces a spontaneous polarization of the same sign.

3. A method as claimed in claim 1 wherein the liquid crystal mixture has an orthogonal smectic phase between the ferroelectric phase and the cholesteric phase.

4. A method as claimed in claim 1 wherein the liquid crystal mixture has a smectic A* phase between the ferroelectric phase and the cholesteric phase.

5. A method as claimed in claim 1 wherein the liquid crystal mixture has a phase sequence I-N*-$S_A$-$S_C$*.

6. A method as claimed in claim 2, wherein each of the optically active compounds present, which make up more than 10% of the total spontaneous polarization, induces a spontaneous polarization of the same sign.

7. A method as claimed in claim 2, wherein the concentrations of the optically active compounds ($c_i$) are adjusted in such a way that the equation (I), $$|Z^{-1}(T)|=|\Sigma_i HTP_i(T)c_i|\leq 1/10\ \mu m^{-1} \quad (I)$$

wherein
Z is the pitch of the helix, HTP is helical twisting power and c is concentration as a mole fraction of the optically active compound investigated, applies for all temperatures in the cholesteric phase.

8. A method as claimed in claim 7, wherein the concentrations of the optically active compounds are adjusted in such a way that equation (II) applies, $$|Z^{-1}(t_{SN})|\leq 1/10\ \mu m^{-1}$$

$$|Z^{-1}(T_{NI})| \leq 1/10 \ \mu m^{-1} \quad (II)$$

where Z is the helical pitch and $T_{SN}$ and $T_{NI}$ denote the temperatures at the limits to the smectic and isotropic phases respectively.

9. A method as claimed in claim 1, wherein the concentrations of the optically active compounds ($C_i$) are adjusted in such a way that equation (III) applies, $$|P(25° C.)| = |\Sigma_i P°_i(25° C.)c_i| \geq 35 \ nCcm^{-2} \quad (III)$$

wherein

P is the spontaneous polarization, P° is the polarizing power and c is the concentration as a mole fraction of an optically active compound.

* * * * *